(12) United States Patent
Dofher

(10) Patent No.: US 6,807,355 B2
(45) Date of Patent: Oct. 19, 2004

(54) SUBSURFACE FIBRE OPTIC CABLE NETWORK INSTALLATION

(75) Inventor: Darren Dofher, Port Coquitlam (CA)

(73) Assignee: TeraSpan Networks, Inc., Vancouver (CA)

( * ) Notice: Subject to any disclaimer, the term of this patent is extended or adjusted under 35 U.S.C. 154(b) by 105 days.

(21) Appl. No.: 10/071,419

(22) Filed: Feb. 7, 2002

(65) Prior Publication Data

US 2003/0123935 A1 Jul. 3, 2003

(30) Foreign Application Priority Data

Feb. 15, 2001 (CA) ................................................ 2337284

(51) Int. Cl.$^7$ ................................................. G02B 6/44
(52) U.S. Cl. ........................................ 385/134; 385/100
(58) Field of Search ................................. 385/100, 134, 385/135, 147, 114, 112, 106; 405/157, 184.4; 174/117 F, 68.1, 68.3, 37

(56) References Cited

U.S. PATENT DOCUMENTS

| | | | |
|---|---|---|---|
| 3,473,339 A | | 10/1969 | Schlafly, Jr. |
| 4,801,764 A | | 1/1989 | Ohlhaber |
| 4,820,007 A | * | 4/1989 | Ross et al. ................... 385/135 |
| 5,239,609 A | | 8/1993 | Auteri |
| 5,668,912 A | * | 9/1997 | Keller ........................ 385/100 |
| 5,879,109 A | | 3/1999 | Finzel et al. ................ 405/174 |
| 5,962,809 A | * | 10/1999 | Duvall et al. .................. 174/37 |
| 6,065,902 A | | 5/2000 | Mayr et al. ................. 405/174 |
| 6,130,982 A | | 10/2000 | Diermeier et al. |
| 2002/0061231 A1 | | 5/2002 | Finzel et al. |

FOREIGN PATENT DOCUMENTS

| | | |
|---|---|---|
| CA | 2229891 | 8/1998 |
| DE | 32 32 108 A1 | 3/1984 |
| DE | 196 23 482 A1 | 12/1997 |
| EP | 0 259 051 A2 | 3/1988 |
| EP | 0 454 345 A2 | 10/1991 |
| EP | 0 603 604 A1 | 6/1994 |
| EP | 0 936 486 A1 | 8/1999 |
| EP | 1 030 204 A1 | 8/2000 |
| FR | 2 769 377 A1 | 4/1999 |
| GB | 2 176 907 A | 1/1987 |
| JP | 57-195206 A2 | 11/1982 |
| JP | 60024511 | 2/1985 |
| JP | 62237407 | 10/1987 |
| JP | 3-102231 A2 | 4/1991 |
| JP | 05241056 | 9/1993 |
| JP | 2000/017720 A1 | 1/2000 |
| WO | WO 99/35346 A1 | 7/1999 |

* cited by examiner

*Primary Examiner*—Rodney Bevernick
*Assistant Examiner*—Mike Stahl
(74) *Attorney, Agent, or Firm*—Storm & Hemingway, LLP

(57) ABSTRACT

A method of installing fiber optic cables consists of cutting a shallow and narrow trench or channel within a road surface or building wall. A narrow fiber optic cable is laid within the channel, and subsequently covered with a patch material. A branching cable network is provided by cutting at periodic and selected locations, a slightly broader and deeper region of the channel, within which cable loops and/or junction boxes are installed. The nodes may consist of branching nodes, or alternatively non-branching nodes containing a cable loop and/or junction box, the installation of which at a location permits a junction node to be formed at a close by location. The invention also consists of a junction box for use with the system.

12 Claims, 10 Drawing Sheets

SUBSURFACE FIBRE OPTIC CABLE NETWORK INSTALLATION

CLAIM OF PRIORITY

This application claims priority from Canadian Patent Application No. 2,337,284 to Dofher, entitled "Subsurface Fibre Optic Cable Network Installation" filed Feb. 15, 2001.

FIELD OF THE INVENTION

The present invention relates to subsurface installation of fibre optic cables, for example, in urban settings where cable is laid buried under the surfaces of streets or sidewalks. As well, the invention relates to fibre optic cable installation within masonry construction and other construction, as well as systems for forming a branching fibre optic cable network.

BACKGROUND OF THE INVENTION

With the rapidly growing need for high-speed data connections to businesses and residences (driven mainly by the need to access the Internet) a faster and more economical method is needed in order to deliver these connections. Optical fibre offers the greatest potential to deliver high-speed services due to its ability to carry high bandwidth over long distances. One problem that the telecommunications industry has been faced with is the high cost of installing optical fibre between the provider and the end customer. This issue has restricted the expansion of optical networks to very densely populated regions where the economics can justify the expensive conventional construction process of burying cable within a relatively large trench.

It has been suggested that an inexpensive and simple means to lay cable is within a shallow slit-like trench cut into an upper layer of pavement or the like, for the laying of a cable within or immediately under a street or other surface. Such a system requires a convenient means to form junctions or branches within the cable system. In conventional cable-laying systems or methods, the forming of a branching network requires considerable additional excavation in order to install conventional junction boxes or the like.

It is desirable to provide a simple and inexpensive system for installing a branching-type network of fibre optic cables within a variety of surfaces. One approach that is known is to install cable within narrow slit-like trenches or recesses that are cut, for example, into street surfaces. Such an arrangement should also provide a convenient means for subsequent location of intersection points, as well as providing for future expansion of the cable network. For the latter, it is important that this system provide an easy means to provide cable slack without requiring the labour-intensive job of splicing of cables to meet future system needs.

Further, it is desirable to provide a junction box or branching node that readily fits within a narrow slit like trench or groove without requiring substantial additional excavation, and which further is easy to install and subsequently locate.

DESCRIPTION OF THE PRIOR ART

Several patents have been issued for technology relating to electrical and optical fibre cable installations.

One example is U.S. Pat. No. 5,879,109 issued to Finzel, et al. which provides a complex process for installing optical or electrical cable into solid surfaces such as asphalt. The method uses a slow moving apparatus to heat the ground surface until it has softened. A channel-forming unit is subsequently used to introduce a channel into the heated ground by displacing the ground material alongside the channel border. A laying unit is then used to introduce the optical or electrical cable into the channel, followed by a filling unit which is used to reintroduce the displaced ground material back into the channel and then rolled to compact the ground material which has been reintroduced into the channel. However, the complexity of this method if used for small segment connections between end customers and providers of optical fibre cable within confined urban locations and in a variety of infrastructure materials would make it prohibitively expensive. Also, this method does not work in concrete material as found in sidewalks, curbs and grout lines, which are often preferred routes in most last mile deployments.

In another example, U.S. Pat. No. 6,065,902 issued to Mayr, et al. provides a method and apparatus for on-site production and installation of optical fibre cable at the location for placing. This method seeks to reduce transportation costs and quantity of material required for large-scale optical fibre cable installations. However, for small-scale installations this method is impractical and notably more expensive.

Canadian published application no. 2,237,324 (Zeidler et al) discloses a method for laying a thin fibre optic cable of between 2 mm and 10 mm, within a narrow channel having a width slightly wider than the cable. The cable is introduced into the channel by means of a cable feed device, and is filled with infill material by a filling device which moves along in a coordinated fashion with the laying device. The laying channel extends into the top several layers of a paved surface and is between 4 cm and 15 cm in depth, with 7 cm being identified as ideal.

The prior art systems and methods tend to be complex, expensive and do not suitably provide for several needs. There is a need for a convenient arrangement for forming cable junctions. There is a need to easily provide slack in the installed cable to accommodate junctions, system expansions and repairs. There is a further need to easily accommodate a variety of surfaces including pavement, sidewalks, vertical walls, unpaved surfaces such as sod, etc.

SUMMARY OF THE INVENTION

The objects of this invention are to provide improved methods and systems for installing cable within a narrow, shallow trench; to provide a convenient cable junction system; and to provide means to accommodate future system expansion. In accordance with the above objects, the present invention comprises in one broad aspect a method for laying or installing of a cable such as a fibre optic cable, or a branching network of fibre optic cables within a surface or substrate such as a paved roadway, a masonry wall or other hard or soft surface. The term "substrate" herein means any surface, whether a roadway, walkway, wall or the like.

It is contemplated that system "nodes" are provided at intervals within the cable network system. A node may comprise a cable junction or a region of looped cable that may be used to provide cable slack for future node or junction installation or other system expansion. In this aspect, the method consists of the steps of:

cutting a narrow channel or groove within a surface such as pavement or other ground surface or a portion of a building or residential unit;

installing a fibre optic cable within the narrow channel;

providing at periodic convenient locations one or more system nodes by installing within the channel at such locations a loop of cable, and optionally a junction box, and connecting to said junction box on opposing sides of an incoming cable and two or more outgoing cables; and backfilling and sealing said channel or groove.

The channel typically has a width between nodes of between about 1 mm and 50 mm with a preferred range of between 2 mm and 12 mm. A still more preferred width is between 4.5 mm and 6 mm. The depth of the channel is between about 8 mm and 250 mm, although there is in principle no limit to the depth of the channel and depths up to 1 m are acceptable. The preferred depth range is between 12 mm and 172 mm. A most preferred depth is between 40 mm and 70 mm. Depending on the width of the channel on each side of a node, the channel may be widened at the region of each node, by up to a further 20 mm but preferably by no more than a further 15 mm.

The deeper end of the depth range of the channel (e.g. 50 mm–1 m) is suitable for crossing streets that may get resurfaced in order to survive a pavement grind and overlay. As well, a deeper cut within this same range is desirable if the surface is breaking away or is in generally bad shape. If the surface is sound then the cut may be in the range of 8–50 mm in depth and preferably about 40 mm deep. In another aspect, the blade that is used on the slab saw makes a cut that is about 4.5 mm wide.

The junction box consists of a narrow, generally flat housing having a width suitable for fitting within the narrow channel.

In another aspect, a metal member capable of detection by a metal locating device is incorporated within the junction box or buried within in a node either in the absence of a junction box or in position with the junction box, in order to provide a convenient means for subsequent location of the junction box or node by means of a metal detection device. The metal member may be either non-ferrous or ferrous, or alternatively, a ferrous member may be buried with a non-junction box node and a non-ferrous member with a junction box node, or vice-versa, for differential (i.e. discriminating) detection by different types of metal detectors after burial.

In a further aspect, the channel as described above is formed within the interstices between pavers on a walkway or roadway, or within a masonry wall. In the case of a wall, the channel has a generally horizontal orientation and is formed between adjacent brick layers. In this aspect, the channel has the width described above but the shallower end of the depth range is sufficient, i.e., about 12 mm deep. The channel is then covered with mortar grouting to provide a matching appearance with the remainder of the brick or masonry wall. In a similar fashion, the channel may be formed in the interstices within a brick or stone walkway or roadway.

In a further aspect, the location of the channels within a masonry wall may be indicated by visual indicators and/or metal implants for location by a metal detection device.

In a further aspect, the channel is wholly within a surface region or layer of an asphalt or concrete roadway or sidewalk. In a further aspect, the trench may be cut at or immediately adjacent to the junction of a roadway and a curb, or within an expansion joint between a curb and an adjacent sidewalk.

In a further aspect, a plurality of cables may be laid in overlying relationship within a trench. The plurality may be between 2 and 20 cables, with a preferred array being 2 to 5 cables.

In a further aspect, the trench may be filled with liquid resin or other anchoring cement to form a smoothly finished patch. An example is a two-part polyurethane grout that hardens, but remains flexible. When hardened, this material is very difficult to pick away and seals the cut. In a still further aspect, a wire may be positioned to immediately overly the installed cables to provide a convenient means for removing the overlying patch material for future maintenance. In a still further aspect, a looped portion of fibre optic cable may be formed within a deepened portion of the channel at a location removed from the junction node to provide cable slack for future expansion of the cable network.

In a still further aspect, one or more of the system nodes include between 1 and 20 loops of cable, for providing slack when required for future system needs, with a preferred number of cable loops being between 2 and 5.

In a still further aspect, the invention relates to a junction box for installation within a narrow slit-like channel or trench, as part of a fibre optic branching network or system. In this aspect, the box consists of a housing or case having flat opposing sides with an overall width selected to fit snugly within the trench. Preferably, this width is between 5 mm and 20 mm, and preferably between 8 mm and 12 mm. A most preferred width is about 10 mm to fit within the narrow slit-like trench or channel. The inside cavity is about 6 mm in width to accommodate passive optical components and/or splices. The two sides are joined together by releasable fastening means. Conveniently, the box is generally rectangular in all elevations. An opening at one of the ends of the box permits entry of input cable line. A plurality of openings on a second, opposed end of the box permits the outlet of output cable lines. The inlet and outlet entries are provided on the narrow ends of the box in order to maintain a flat, narrow arrangement when the cables are joined with the box. Sufficient interior space within the junction boxes is provided for joining together the input and output cable ends. As well, passive optical networking components and optical splices may be placed in the box.

In a still further aspect of the above method, one or more loops of cable slack are formed to surround the junction box prior to burial of the node.

A further aspect of the invention relates to a cable-winding device for forming one or more cable loops for installation in a node. The winding device comprises a base having cable-receiving means at either end for winding a length of cable, which may be subsequently removed from the device for burial. Conveniently, rotatable arms at the receiving means releasably retain the cable. A junction box retaining means such as an array of pegs extending from the base may be provided to releasably hold a junction box against the base in position from wrapping cable loops around the box.

A generally rigid frame such as a rigid wire loop may be provided to support the cable loops. By "rigid" is meant having sufficient rigidity to protect a cable loop from damage. A high degree of rigidity is not necessarily required. The frame has generally the same configuration as the cable loops, and is joined to the base either before or after the loops are wound about the base. The combined looped region of cable and wire frame are then released from the winder for burial. The attached wire frame adds rigidity to the cable loops to prevent inadvertent crushing before or after burial.

A still further aspect of the invention relates to a rigid conduit for burial of cable within a narrow trench or channel set within a soft ground surface such as sod. In this aspect, the conduit comprises an elongate, hollow conduit such as a length of PVC pipe having a channel extending into the interior thereof and extending the full length of the conduit. The conduit may have a generally circular oval or rectangular cross-section. The invention further relates to a method for installing cable within a soft ground surface such as sod by cutting a narrow trench as described above, and installing into the channel one or more fibre optic cables together with an elongate conduit as described above with the channel facing downwardly followed by burial of the conduit to restore the surface.

A further aspect consists of a fibre optic cable comprising a substantially waterproof outer casing, a fibre optic core, and an absorbent material within the interior of the cable, such as a string having a super-absorbent polymer embedded in its fibres.

The terms "base", "cap" and like references are not intended to refer to any particular spatial position of any component but are used herein to refer to various components purely for ease of description.

The term "approximately" or like terms herein mean plus or minus 10 per cent.

DETAILED DESCRIPTION OF THE PREFERRED EMBODIMENTS

Figure 1:
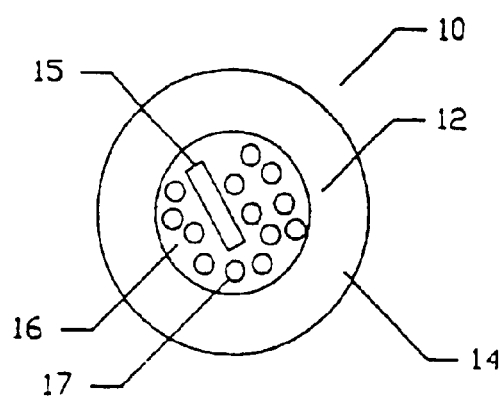
FIG. 1 is a sectional view of a typical fibre optic cable for use in accordance with the present invention.

Turning to FIG. 1, the present invention is intended to be used in association with narrow gauge fibre optic cables 10, composed of a polycarbonate and polyester alloy outer casing 12 such as GE Plastics "Xenoy" material and an inner core 16. The core is composed of multiple optical fibres 17 and a moisture-blocking element 15. The core is preferably wrapped with a moisture barrier 14. The moisture-blocking element 15 comprises a string with super absorbent polymer (SAP) embedded into its fibres extending the length of the cable. The outside diameter of the cable casing is about 3.8 mm (about 0.15 inches) with a wall thickness of about 0.9 mm. The fibre used is a non-ribbonized coloured loose fibre with a diameter of 0.25 mm. These dimensions are by way of example only and may be varied to suit the application as is known in this art.

The relatively narrow cable contemplated for use in this invention allows for easy placement into saw cuts made by common diamond blades. For cable installation within sidewalk joints and masonry surface walls, the cut should preferably be less than 0.3 inches and more preferably, less than about 0.1875 inches in width so that existing lines in sidewalks (joints and breakpoints) and grout lines between bricks can be followed without defacing the appearance and integrity of the infrastructure. The channel width is between 1 and 25 mm, with a preferred range between 2 and 12 mm and a still more preferred range between 4.5 and 6 mm. A small diameter cable allows installation under existing surface mounted conduits by elevating the conduit off of its underlying surface with a spacer block between the conduit and the surface. This spacer block will shift the conduit slightly (without disruption) following which the fibre cable can be pushed under the conduit and permanently mounted, as will be described in more detail below. The channel depth is described below.

It is important that the cable remain reasonably straight when it is removed from the spool for installation into a crack or cut into a surface, so that it will lie flat in the bottom of the cable channel. If the cable has fixed bends from handling or from memory of being on the spool, it will tend to rise out of the channel in certain spots, making installation a challenge. To minimize fixed bends or memory of being spooled, the material used in the casing of the cable may be polycarbonate and the cable spool diameter should be sufficiently large to prevent memory (for example a 30 inch diameter core on the spools). A polycarbonate material does not distort easily; it springs back into its original shape after being handled (unless it is kinked with significant force). The polycarbonate material also exhibits a full range of good physical, chemical, and economical properties making it suitable for the present invention.

In general, a cable installation system comprises a length of cable installed within a relatively shallow and narrow channel (the nature of this channel will be described in detail below), interspersed with one or more "nodes". A node comprises a region of channel containing either loops of cable to provide cable slack, or a cable junction, or both loops and a junction.

Figure 2A:
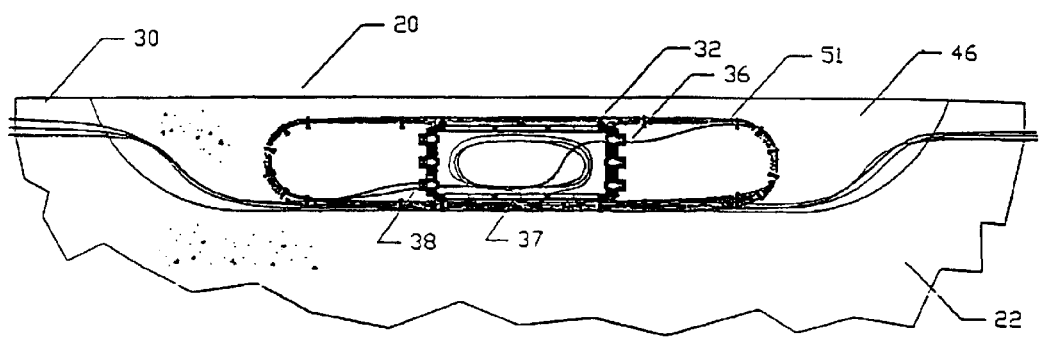
FIG. 2(a) is a side elevational view showing a subsurface installation according to the present invention, including a junction box and cable winding device.
Figure 2B:
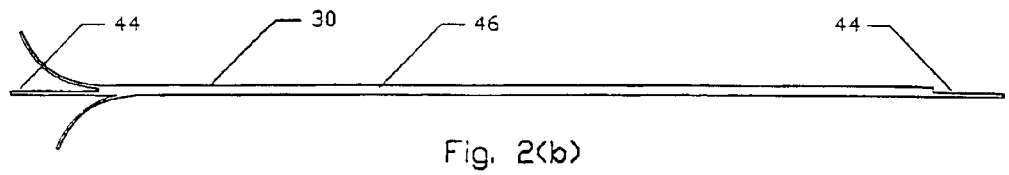
FIG. 2(b) is a plan view of an installed subsurface system.

Turning to FIGS. 2(a) and 2(b), a typical node installation 20 is shown. A narrow slit-like trench or channel 30 is excavated into a paved roadway 22. The channel 30 may be cut into any type of paved surface such as concrete or asphalt, or into the interstices between courses of paving blocks. The dimensions and mode of excavation will be described in greater detail below. At the node 20, the trench depth and width is increased in order to accommodate a junction box 32 and accompanying cable loop 34. Within the trench leading up to and leading away from the node, the cable is installed in a conventional manner within the trench, such that it lies on the floor of the trench. At the node 20, the cable is looped into one or more loops 34 to provide slack for cable manipulation. The incoming cable includes a cable end 36, which enters a first side of the junction box 32. Within the junction box, the incoming cable end 36 is joined with a plurality of outgoing cables 38. For example, an incoming cable having twelve optic fibres may be mated with two outgoing cables having two and ten fibres respectively. Other examples are contemplated, including one or more incoming cables with 2 to 50 fibres, each mated with single or multiple outgoing cables. A portion of the outer casing of the cable is removed to expose the optical fibres in the region of cable that will be fitted into the junction box. A selection of the exposed fibres 37 may be severed and respliced to optical fibres from a cable branch. Alternatively a passive optical component (not shown) can be spliced in to form a branch with another cable. The outgoing cables may all be laid within a common outgoing trench. Alternatively, a plurality of outgoing trenches may be provided in different directions heading away from the node where it is desired to form a network branch (FIG. 2(b)). If the outgoing plurality of cables are laid within a common outgoing trench, a branch may be provided at another location.

A metal member 35 may be buried within the node 20 for subsequent detection by a metal detector in order to find the location of a node after burial. The member 35 may be buried with either a junction box-containing node or a non-junction box node, or both. It is also possible to provide a means to discriminate between junction box and non junction box nodes after burial by providing eg. ferrous and non-ferrous members 35 within the different node types for locating by different types of metal detectors.

FIG. 2(a) illustrates a looping of separated optic fibres formed within the interior of the junction box 32. This provides additional slack for future needs. For this purpose, individual cables are stripped of their casing to release the individual fibres 17 each coated, a length of which are then pulled into the box. The surplus fibres are looped within the interior of the box 32. One or more loops of the cable 10 may be formed within the junction box 32.

The cable 10 is preferably installed as one long continuous cable. Installation of a junction box 32 requires that only the outer case 12 of the cable is cut away and the optical fibres 17 inside remain uncut and continuous. About 40 to 100 cm of the casing is stripped at the site of the junction box thus exposing the optical fibres that then are looped inside the junction box. The ends of the casing are clamped into the junction box so that the loops of exposed fibre can be spliced and worked without being strained by the springy cable casing. A passive optical component (not shown) may be spliced into a passing fibre or the fibre from the primary cable may be severed and spliced onto a fibre from a cable that goes in a different direction.

Figure 3:
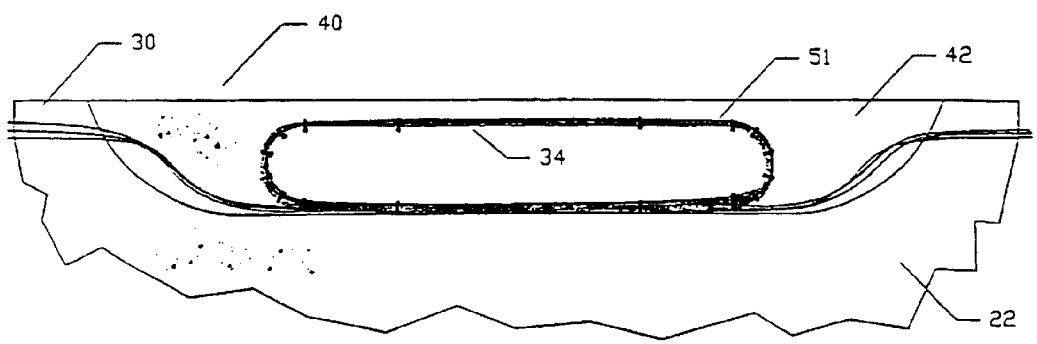
FIG. 3 is a similar view as in FIG. 2(a), showing a looped cable within a subsurface installation.
Figure 4A:
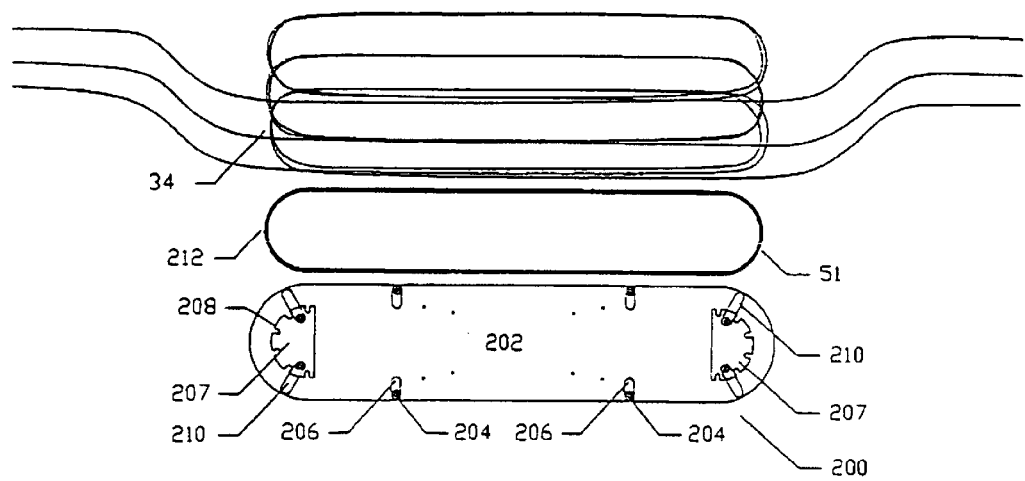
FIG. 4(a) is a side elevational view, showing cable loops being prepared for burial using a cable winding device.
Figure 4B:
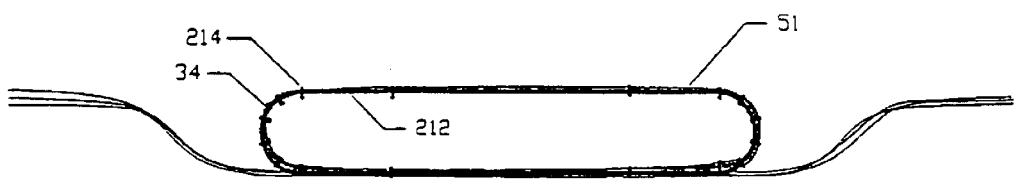
FIG. 4(b) is a view similar to FIG. 4(a) with the cables ready for burial.

FIG. 3 illustrates a non-junction node 40 of the network, which provides a looped portion 34 of cable to provide cable slack to accommodate future system expansion. At this node, the trench 42 is deepened, and one or more cabled loops are buried within the trench at this location. FIG. 4(a) illustrates the cable loops prior to burial, and FIG. 3 illustrates such cables subsequent to burial. At these nodes, a junction box 32 may be installed in the future or cable may be drawn for future repair or expansion projects. For this purpose, cable slack may be utilized from the node to permit such future installation. The loops 34 may be of any convenient size. As a non-limiting example, the loops may each comprise between 0.3 and 3.0 metres of cable formed into an oval or possibly a circular loop. With the spacing described below, the excess fibre optic cable comprises from 0.3% to 10% of the total fibre optic cable in the network. Conveniently, nodes containing either junctions or simply looped cable may be provided about every 5 to 100 metres of channel. It is understood that node spacing cannot be maintained at an exact distance due to variations in the substrate into which the network is being installed. To facilitate future growth and periodic maintenance, the nodes will be spaced apart an average of 10–40 metres, with a preferred spacing being about every 25 metres on average. While not necessary, preferably there is at least one non-junction node 40 for each junction box 32 in a network. Further, a loop node may be provided on either side of a roadway for roadway crossings of the installed cable.

FIGS. 2(a) and 2(b) show a trench 30 cut into a surface at a branching node position. It will be seen that the trench has a relatively narrow width at the locations 44 adjacent to the node, in the order of about 4 mm. At the node, the width 46 is increased by up to a further 20 mm, with a preferred increase being about 15 mm, making the trench width at this region about 19 to 21 mm. Conveniently, the slit-like trench may be cut into a surface by means of a saw. At the nodes, the depth of the trench is also increased. At positions between the nodes, the trench depth is in the order of 40 mm, while at the nodes the trench depth is in the order of 80 to 200 mm, with a preferred depth of about 150 mm in order to accommodate the cable loops and junction box. However, even at its deepest the trench is wholly or substantially within the asphalt or concrete layer of an asphalt or concrete roadway or sidewalk. If the trench is within a masonry or sidewalk joint, it is preferably fairly shallow for convenient installation and subsequent uncovering.

Concerning the trench depth, the depth is selected to be sufficiently close to the surface for ease of installation. However, the depth cannot be so close to the surface as to present a risk of disruption or cutting of the cable as a result of normal wear, tear and cracking of the surface, or shallow cutting of the surface as a result of routine maintenance. Thus, the inter-node trench depth is between 8 mm and 250 mm, with preferred depths between 12 and 172 mm and between 30 and 80 mm. A still more preferred depth for most applications is between 40 and 70 mm with a most preferred depth being in the order of about 40 mm.

Figure 5A:
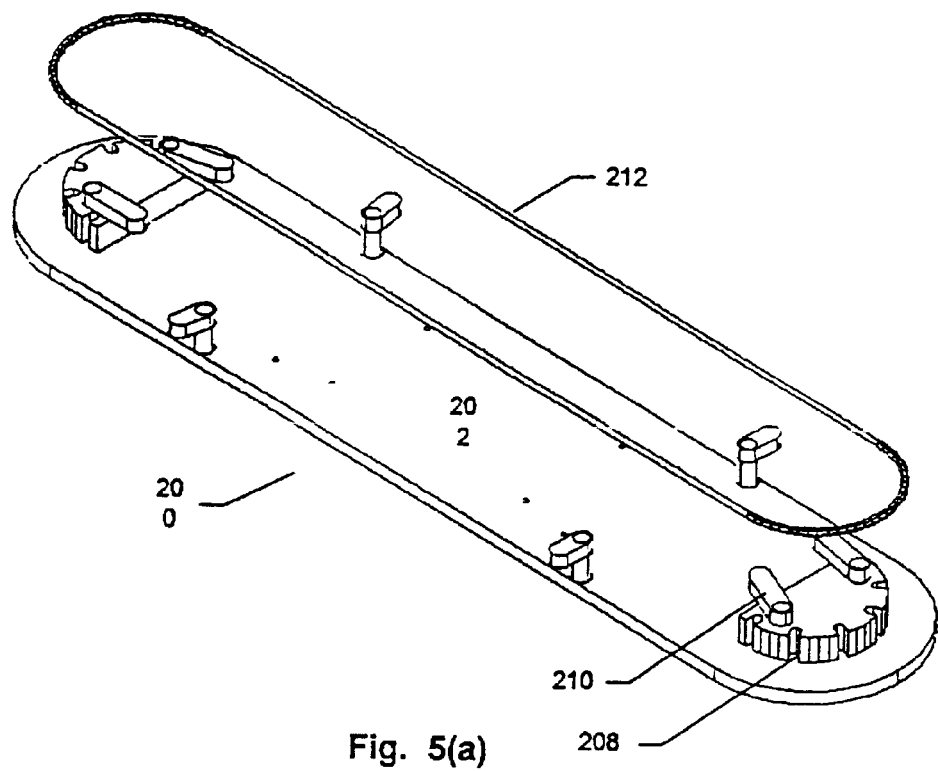
FIG. 5A is a perspective view of a cable winding device with its wire frame separated.
Figure 5B:
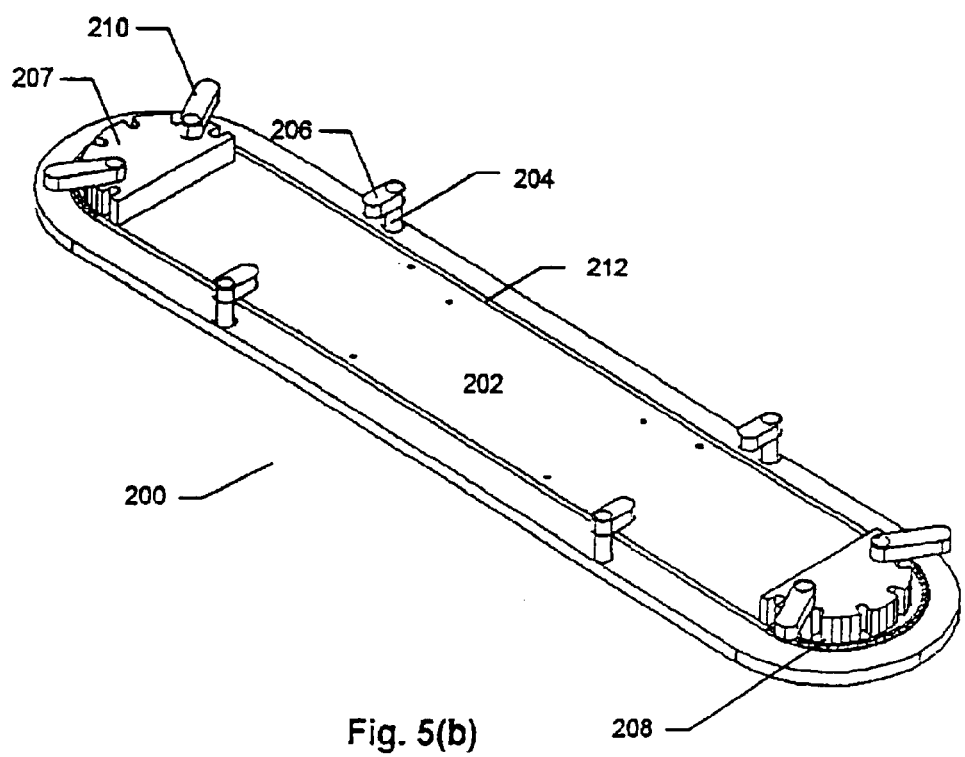
FIG. 5B shows the cable winder with the wire frame in position ready to receive loops of cable.

Forming one or more cable loops for burial at a node may be carried out by means of a cable winding device 200, as shown in FIGS. 2(a), 4(a), 4(b), 5(a) and 5(b). The winding device comprises an elongate base 202, which conveniently has a general oval shape with rounded ends. A pair of pegs 204 is mounted along each side of the base, each peg being capped by a pivoting arm 206 that rotates freely between a first outboard position extending past the perimeter of the base, and a second inwardly directed position. Mounted to either end of the base, and stepped back from the ends thereof, is a pair of winding blocks 207 having a rounded and grooved outwardly facing edge 208. The blocks 207 comprise cable-receiving means for winding a cable about the two blocks. The receiving means could comprise a suitable outer surface for receiving cable. Each block 207 supports a pair of pivoting arms 210 on its upper surface. An oval wire frame 212 is provided, the configuration of which matches the shape of the base 202 although dimensionally smaller to be set inwardly from the perimeter of the base. As seen in FIG. 5(b) the frame 212 is engaged against the base prior to winding cable about the device, such that the frame extends around the winding blocks, but inwardly from the pegs 204. The device may then receive cable for winding about the winding blocks and against the wire frame. After a selected number of loops of cable have been wound around the device, the end arms 210 are rotated outwardly to retain the cable loops and an array of ties 214 may be wound around the looped cable and frame to bind these components together prior to burial, as in FIG. 4(b). The cable, with frame 212 attached, is removed from the device 200 for burial in a node. FIG. 4(a) illustrates schematically a winding device, including winding frame, with wound cables ready for burial.

A junction box may also be retained by the winding device, as seen in FIG. 2(a). For this purpose, the junction box is position against the base 200, and is held in position by arms 206 being inwardly turned as in FIG. 5(b). While the junction box is thus retained, one may perform an initial winding of cable about the winding device, as well as formation of a junction within the junction box which has its lid removed for this purpose. The wound cable loops, together with the sealed junction box with spliced cable therein, are then installed within a trench, as in FIG. 2(a).

Preferably, the wire frame 212 remains attached to the bundle of cable loops and is buried along with the looped cable within the node. The frame provides a degree of structural support to the loops to prevent pinching or breakage after burial. Alternatively, the frame may be removed prior to burial of the cable loops, particularly if the cables are believed to have sufficient strength to withstand burial without pinching or breakage.

Conveniently, the trench may be formed in two steps. In a first step, a narrow saw cut is made within the solid substrate along the full length of the proposed cable line to form the main trench having a width and depth as described above. In a second step, at each node a second saw cut is made with a second, wider blade to cut a slightly wider and somewhat deeper trench 46 at the node position, to form a node-region having the shape shown in FIG. 3. The trench 46 may be formed with one blade on a slab saw such as an 18-inch diamond blade with a width of about 4 mm. The blade is dropped down 150 mm for the first pass, followed by a parallel cut in a slightly offset angle. The material between the cuts breaks away to form the required junction box cut.

Figure 6:
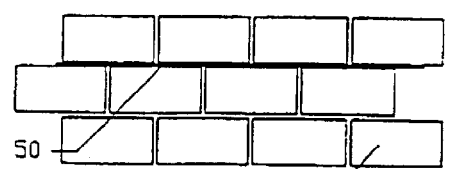
FIG. 6 is a side view of a masonry brick wall with a cable installed within a horizontal channel.
Figure 7:
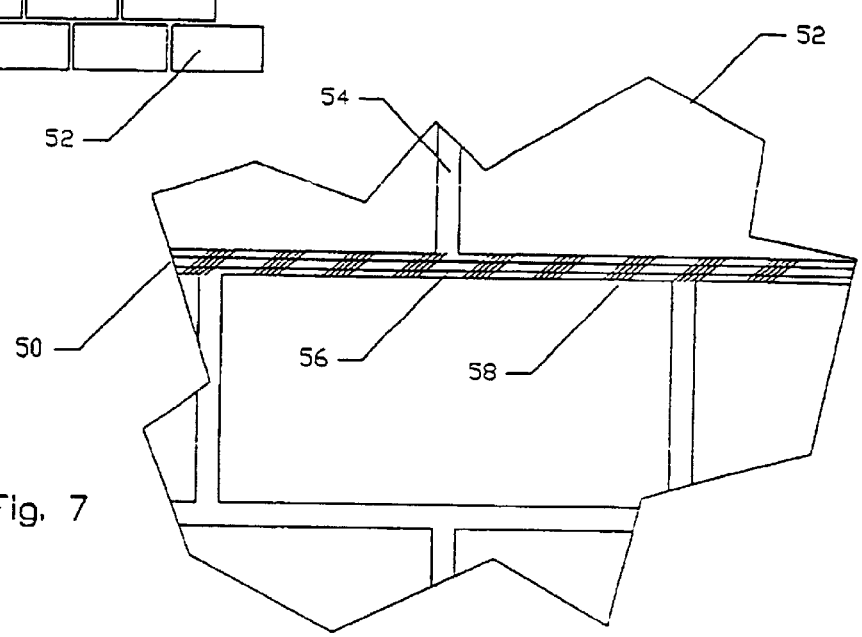
FIG. 7 is a close-up view of FIG. 6 showing a cable installed within a narrow channel between brick layers.

As seen in FIGS. 6 and 7, a channel 50 may be cut or formed horizontally within a wall 52. FIGS. 6 and 7 illustrate a masonry wall construction although it will be readily seen that other types of wall or wall surfaces also easily accommodate a similar cut. In FIGS. 6 and 7, a channel is shown having the inter-brick mortar 54 between courses of brick or other masonry blocks. Following installation of the fibre optic cables and nodes, the channel may be covered with additional mortar or anchoring cement. This may be a semi rigid grout material like polyurethane 56, to cover the channel. In one version, visual indicators 58 are provided to indicate the location of the channel for future work and to provide a warning to building owners as to the location of the cable. Such visual indicators may take any convenient form including a decorative arrangement.

Figure 7A:
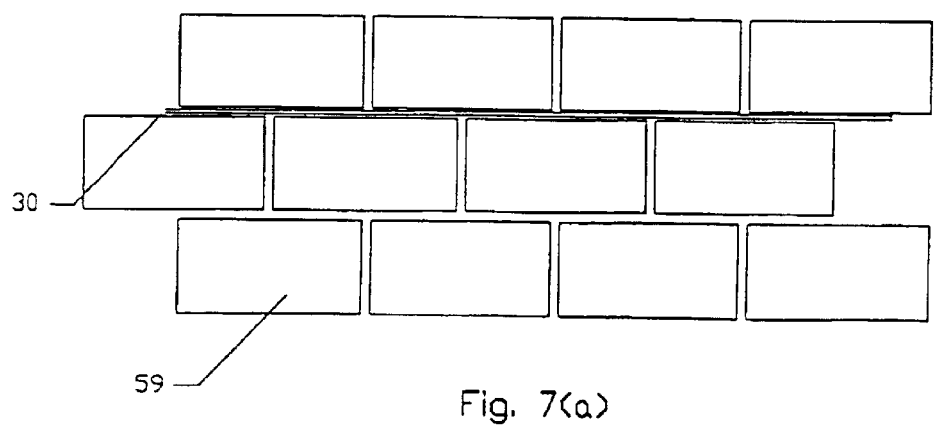
FIG. 7(a) is a plan view, from above showing an installation within a roadway formed from pavers.

FIG. 7(a) shows an installation option somewhat similar to that in FIGS. 6 and 7, however, the channel 30 is cut vertically within a roadway into the interstices between paving blocks 59. The steps are otherwise the same as described in connection with FIGS. 6 and 7.

Figure 8:
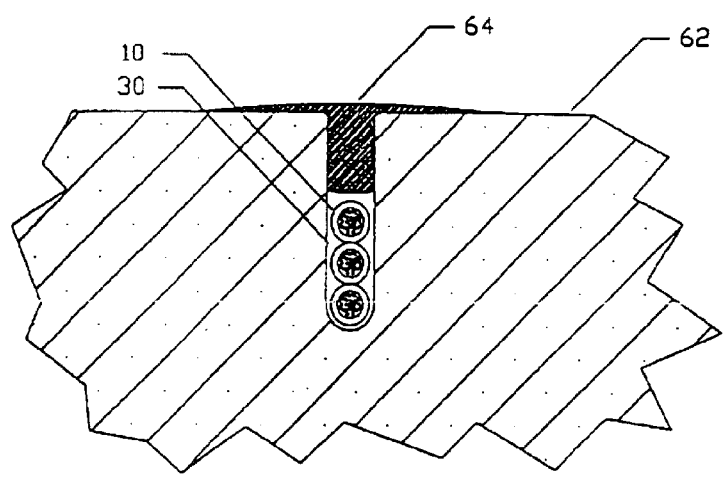
FIG. 8 is a sectional view, showing a trench cut within an asphalt or concrete roadway or sidewalk, with a plurality of cables buried within the channel.
Figure 9:
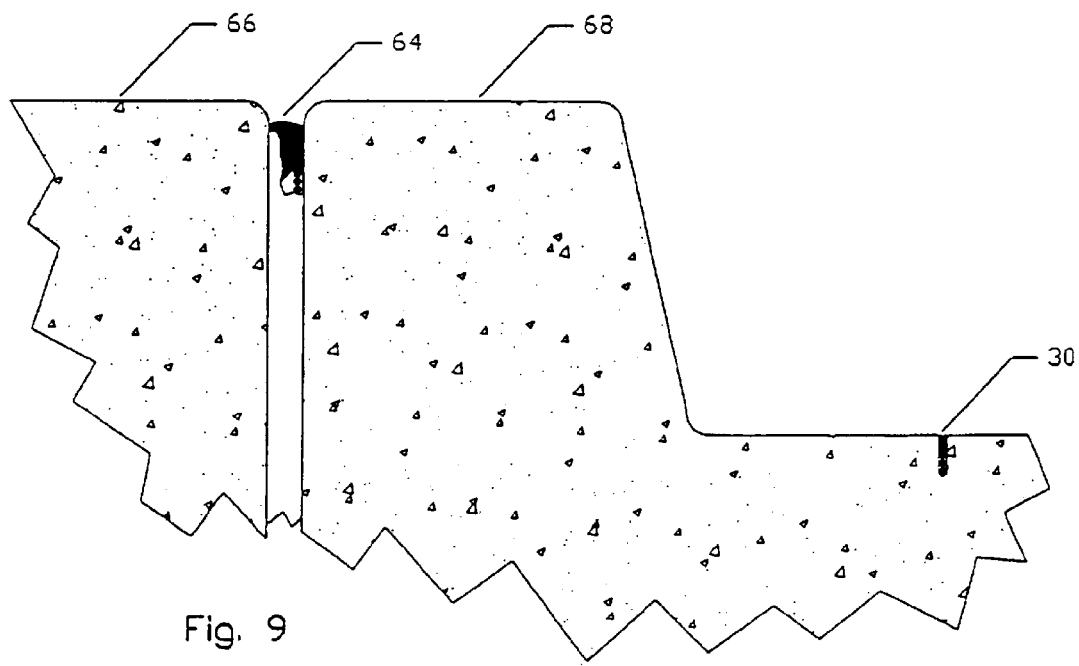
FIG. 9 is a similar view, showing a channel recessed into an expansion joint between a curb and sidewalk.

FIGS. 8 and 9 illustrate additional installation options. In FIG. 8, a slit-like channel 30 is cut vertically into an asphalt or concrete surface 62 such as a road or a sidewalk. A plurality of cables 10 are installed within the channel in overlying relationship. By way of a non-limited example, a convenient array is up to four cables in a stacked overlying relationship within the channel. The channel is then patched with liquid rubber semi-rigid grout material such as polyurethane or anchoring cement 64 to provide a generally flush appearance. FIG. 9 shows a similar arrangement, in which the channel 30 is cut into an expansion joint between a sidewalk 66 and an adjoining curb 68. FIG. 9 also shows a similar channel 30 within a paved roadway 22 at a location close to the curb. Another convenient installation option is a channel cut at the line of the intersection between a roadway and a curb.

Figure 10:
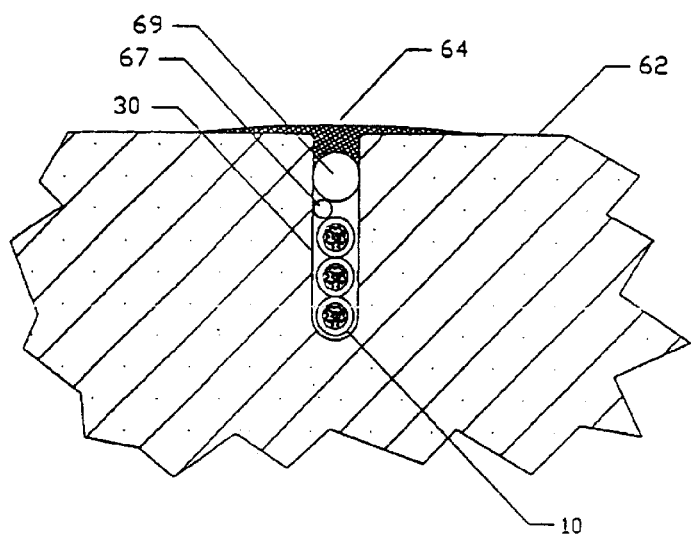
FIG. 10 is a similar view, showing a close-up view of multiple cables installed within a trench cut into asphalt or concrete.

FIG. 10 shows a close-up view of an installation of the type shown in FIGS. 8 and 9, with a plurality of cables 10 installed within a trench 30 in stacked overlying relationship.

A locator wire 67 is positioned to overlie the cables 10. The wire 67 is locatable by a metal detector and permits early localization of the buried cables. Also, overlying the cables 10 is a rigid backing rod 69, for preventing the grout materials from sticking to the cables.

Figure 12:
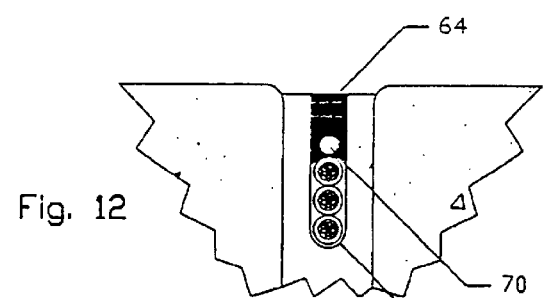
FIG. 12 is a more detailed view of the installation shown in FIG. 11.
Figure 11:
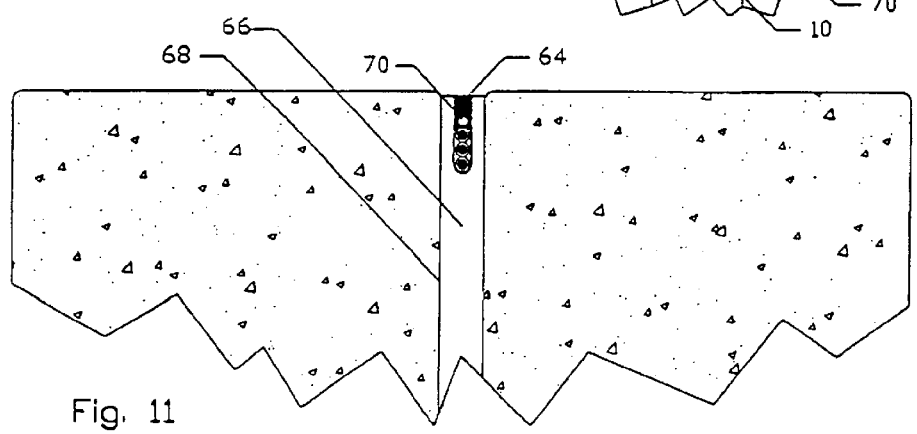
FIG. 11 is a cross-sectional view showing an alternative installation within a concrete or asphalt roadway or surface.

The trench is then patched with a convenient patch material 64 to provide a smooth appearance. FIGS. 11 and 12 show a similar arrangement with one or more cables 10 are installed within a narrow trench or channel 30 recessed into a sidewalk joint 66. The channel may be either vertical or horizontal. The preferred patching material is a silica-fumed grout.

FIGS. 11 and 12 illustrate a vertical channel or trench 30 having vertical sidewalls 68. The cables are overlaid with a sturdy wire 70, the purpose of which is to aid in future removal of the patch material 64. When it is desired to remove the patch material at a future date for maintenance or system expansion, all that is required is to excavate a portion of the channel to reach the wire. The wire 70 may be then pulled upwardly to remove the patch material from as much of the channel as is desired. The wire is formed from a corrosion-resistant and sturdy material, such as braided cable or any other convenient and suitable wire or cable arrangement. It is also contemplated that the wire 70 may be detectable by a metal detector thus serving the same purpose as the locator wire 67.

The purpose of providing a plurality of cables in stacked array within the same trench is to facilitate splits and routes and to increase the fibre count delivered to an area. This feature makes it possible to cover a broader area and lessens the number of road or sidewalk cuts required.

Figure 13:
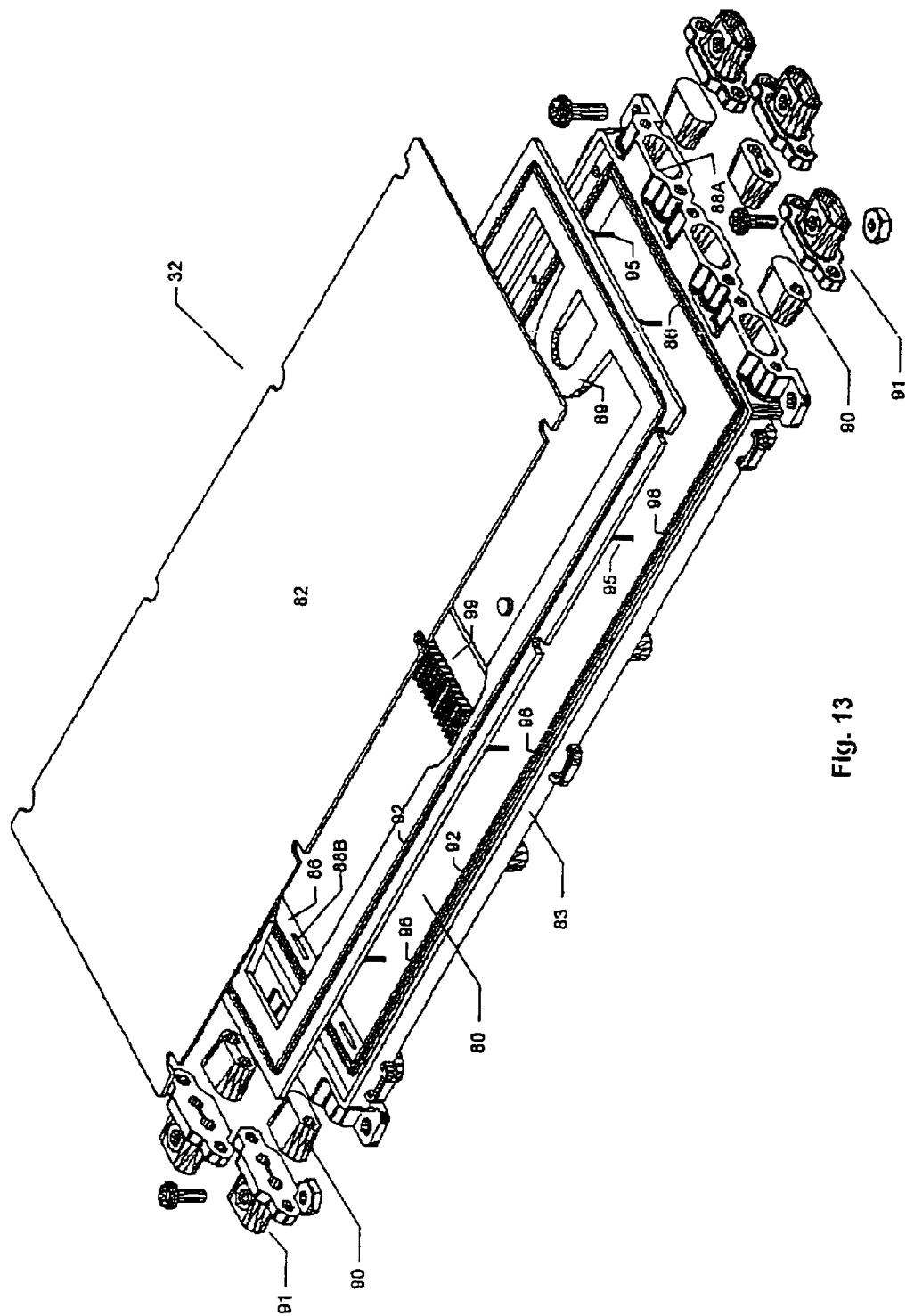
FIG. 13 is a perspective exploded view of a junction box according to the present invention.

Turning to FIG. 13, a junction box 32 according to the present invention is illustrated. The box is generally rectangular in plan and elevational views, and is generally flat and plate-like in appearance. The box comprises a flat base 80, with a flat lid 82 removably joined to the base by screws or other like fastening means. In use, the box and lid form sidewalls when the box is in a vertical orientation. Shallow sidewalls 83 and end walls 86 extend from the base 80. The interior of the box receives cables and other components, as will be described below. Opposed end walls 86 of the box are provided with a series of cable entry and exit orifices 88a and 88b, respectively. A plug 90 is provided at each opening 88 to prevent or minimize moisture entry. Cable lock 91 prevents slippage of the cables through the orifices 88a and 88b. The interior of the box provides sufficient space for a junction to be formed between one or more inlet cables, and a plurality of outlet cables. The junctions are formed by conventional means and are not shown. An inwardly stepped shoulder 92 on the sidewalls 83 and endwalls 86 support a cable retainer 87, consisting of a flat rectangular plate with a hollow middle region. The retainer 87 is held in place by projections 95 that fit within holes 96 within the walls 83, 86. The cable retainer 87 projects inwardly over the sidewalls and end walls 83 and 86, i.e. the sidewalls are undercut from the inside edges of the retainer. An additional tongue 89 projects inwardly from each end of the retainer 87. A cable loop positioned within the junction box 32 is prevented from springing outwardly from the box before the lid 82 is fastened, by the retainer 87. In particular, the retainer 87 prevents a portion of the cable loop from being caught under the lid 82 as the lid is fastened to the box, thereby minimizing the risk of pinching of the cable as the lid is fastened. The tongues 89 are provided to catch any portion of the cable loop that is not otherwise caught by the retainer 87.

The retainer 87 is composed of a semi-rigid rubber material and also functions as a sealing gasket. Ridges 92 on the walls 83,86 of the box mate with the flat underside of the retainer 87 and help to create a seal. Likewise, ridges 92 on the topside of the retainer 87 mate with the flat lid 82 to help create a seal. The interior of the box 32 also provides sufficient space to house optical networking components such as splitters. A cable splice holder 99 is fastened to the base 80, and comprises of an array of semi-ridged, semi-tubular members for releasably retaining an array of spliced cables. Typically, a cable splice includes a thickened portion formed by a heat shrink-wrap extending around the spliced portion. These wrapped portions of individual fibres are individually held within the splice holder 99. Alternatively, the splice holder may hold optical splitter components.

The box preferably has a width of no more than about 12 mm, in order to fit within the node region 20 of the trench or channel described above. However, the box may have any width within the range of widths acceptable for the trench width at the nodes. The height and length of the junction box are within a range for fitting within the trench nodes, as described above. In one version, the box is in height and length about 95 by 190 mm. In another version, the height and length are 65 mm long by 250 mm respectively.

Other convenient dimensions for the box range from the above dimensions to about 290 mm length×110 mm height× 12 mm width. It will be noted that the above dimension examples are merely preferred examples and are not intended to limit the dimensions of the box, which may have inconvenient dimension of a size which is suitable for installation within a node, while having sufficient interior space to conveniently permit the formation of a cable splice. The junction box may comprise an ABS or ABS polycarbonate alloy base, conveniently with a stainless steel lid. The gaskets 92 and plugs 90 associated with the box 32 comprise rubber, such as "Santoprene" or equivalent.

Figure 14:
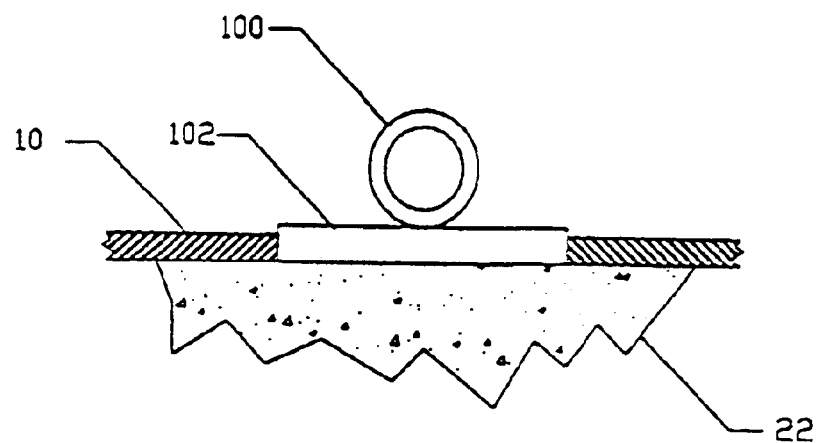
FIG. 14 is a front elevational view of a further embodiment of the invention showing an exposed cable installation passing under a conduit.
Figure 15:
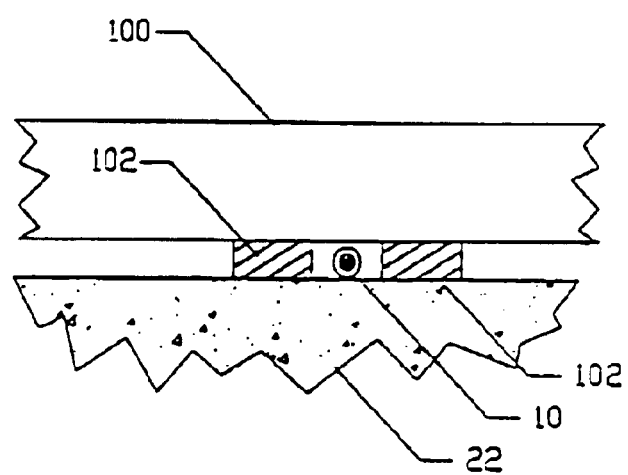
FIG. 15 is a side elevation of the version of FIG. 14.

In a further aspect, as seen in FIGS. 14 and 15, a cable 10 is installed underneath an existing surface mounted (i.e., above ground) conduit 100. This embodiment relies on a conventional conduit of the type that is supported on a surface 22, for example a cable-containing conduit supported by a paved surface such as may be found in industrial settings. Similarly, a conduit may be surface-mounted against a wall. A small space is created beneath the conduit by separating the conduit from the surface. This is accomplished by inserting under the conduit a series of spacer blocks 102. It is contemplated that these will be about 0.1875 inches in thickness, although this thickness will vary depending on the diameter of cable and other factors. Suitable thickness of the blocks 102 may range from 0.1 inches to 0.3 inches. Within the space thus created, one or more cables 10 are inserted and then installed with cement or the like. Junction boxes 32 as described above may be similarly mounted, as well as cable loops 34 being formed at nodes.

It is contemplated that the method of the present invention is suited for retrofitting of existing infrastructure, such as existing streets, pathways and buildings. However, the method also benefits applications in new construction of infrastructure such that the required channel or trench is set into the new construction at the time of construction or shortly thereafter. This applies to new roadways or pathways as well as new buildings, masonry walls and the like.

It will be further noted that the method of the present invention involves a single step procedure for cutting a trenchway and laying a cable therein. The equipment required for cutting the necessary trench is typically a conventional rotary saw. Specialized equipment is not general necessary for cutting such a trench.

Figure 16:
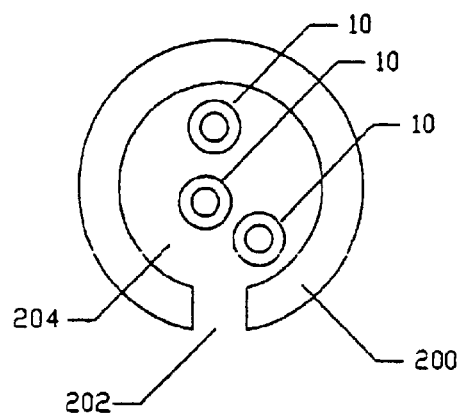
FIG. 16 is a sectional view of a further embodiment illustrating a rigid conduit for retaining and protecting cables.
Figure 17A:
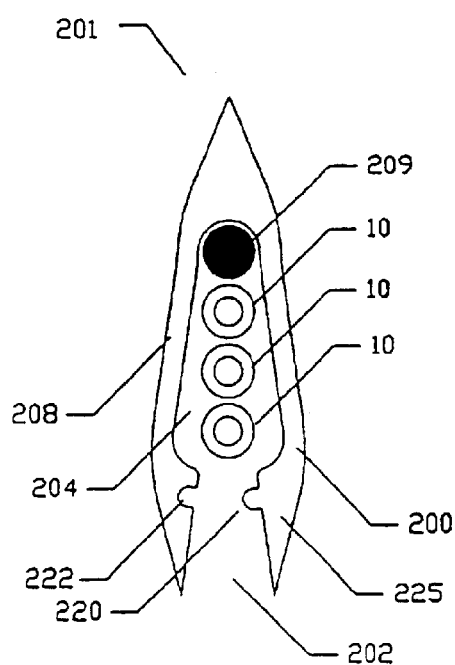
FIGS. 17(a) and 17(b) are sectional views of another version of a conduit for retaining cables.
Figure 17B:
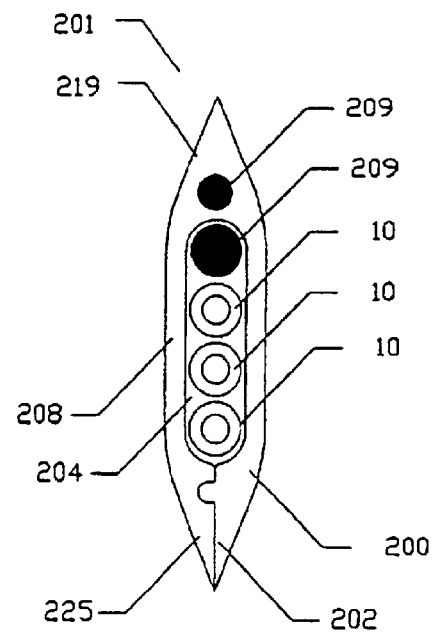

A still further aspect of the invention is illustrated at FIGS. 16 and 17. In this version, a single cable or a bundle of cables is buried within a soft substrate, such as sod, earth, gravel, etc. A channel is formed into the substrate, having a depth within the ranges specified above. The width, however, may be wider. A cable protector is provided, comprising a rigid or semi-rigid elongate member 200, having an opening 202 to the exterior of the member. The opening 202 extends the full length of the elongate member, and opens into an interior space 204. In one version (FIG. 16) the elongate member 200 comprises a length of tubular pipe, such as PVC pipe, having a groove or channel 202 extending the full length thereof. In another version (FIGS. 17(a) and 17(b)) the member comprises an extruded component 201, such as a plastic extrusion, having parallel sidewalls 208, and an open channel 202.

The protector of FIG. 17 has a slimmer profile than the first version (FIG. 16) and is thus capable of fitting within a somewhat narrower trench than the version of FIG. 16. The cable protector of FIGS. 17(a) and (b) is generally boat shaped in section, with the upper and lower ends thereof tapering to a sharp ridge. The tapered upper end serves to deflect a shovel or the like which may accidentally disturb the protector. As well, the upper end region of the protector comprises solid material, thus providing additional resistance against breakage. The protector may be formed from rigid or semi-rigid PVC or other suitable material. The sidewalls 208 are openable to receive cables into the interior of the protector, and are snapped shut by a mating locking ridge 220 and groove 222. Conveniently, the protector is molded such that the rest position thereof is in the open configuration shown in FIG. 17(a), thereby permitting easy positioning of cables within the interior. When ready for burial, the sidewalls may be snapped shut, as shown in FIG. 17(b). Alternatively, the rest configuration may be closed as shown in FIG. 17(b), with the sidewalls 208 being forcibly separated to permit entry of cables. The lower end 225 likewise reaches a point, for facilitating burial within a soft substrate. A rigid member such as steel rod or cable is positioned within the interior of the protector 200, above the cable array 10, for additional protection against damage by an accidental shovel or the like intruding on the protector.

Alternatively, the cable or rod may be molded in place within the upper region 219 of the protector 200.

Installation of cable protector 200 or 201 is carried out by providing one or more cables (the number of individual fibre optic cables will be determined by the capacity of the interior space 204, and is conveniently between 1 and 10 cables, and most preferably between 1 and 4 cables).

Installation of the second version of the cable protector 201 may be carried out in a somewhat different fashion. In an initial step, the metal rod or cable 209 may be positioned within the interior space 204, or alternatively, the protector 201 may be provided with the rod or cable 209 already in place within the interior 204. The cables 10 are then positioned within the interior 204 in a stacked array, and the walls 208 are then snapped shut. The closed protector 201 may then be buried within a narrow channel. Alternatively, a slit may be formed within the substrate for example by passing a blade over the surface of the substrate at a relatively shallow depth which may be less then the depth of the protector 201. The protector 201 is then pushed downwardly into the sub-straight, with the relatively sharp and angled lower portion 225 serving to form a channel within the substrate to receive the protector 201. Preferably, the protector 201 is pushed into the substrate to a depth sufficient to permit burial of the protector 201. For example, the overall thickness or width of the protector 201 may be approximately 6 to 10 mm and the top to bottom height in the order of 20 to 40 mm. The protector 201 contained in cables 10 may be buried 2 to 20 cm below the ground surface and preferable about 5 to 15 cm underground. This is accomplished by pressing the protector 201 into the ground by the desired depth, followed by covering the disturbed soil region for example by back-raking. However, the channel or trench formed by the process may be sufficiently slim that it may not be necessary to replace the disturbed substrate, as this is likely to happen on its own over a short time. The elongate member 200 is then positioned such that the channel 202 faces downwardly, and the cables are then positioned within the interior space 204. The elongate member 200, with the cables received therein, is then set into the trench, in a face downwardly position (i.e. the channel facing downwardly), and then subsequently buried to restore the surface. It is not critical that the channel face directly downwardly, it may face e.g. sideways, although a downward facing direction is preferred to minimize entry of soil into the channel 202. One or more nodes as described above may be formed in this version, in the same manner as described above.

It will be seen that the present invention has been described by way of preferred embodiments of various aspects of the invention. However, it will be understood that one skilled in the art may readily depart from the embodiments described in detail herein, while still remaining within the scope of the invention as defined in this patent specification including the claims thereto.

What is claimed is:

1. A fibre optic protector for subsurface burial, said protector comprising an elongate member having sidewalls defining a space there between, with a closed upper end and a selectively openable lower end, the space between said sidewalls being suitable for receiving and retaining two or more fibre optic cables in stacked array, said openable lower end including a closure to selectively open said protector to receive said cable and close said lower end for burial.

2. A protector as defined in claim 1, wherein said upper end comprises a tapered ridge.

3. A protector as defined in claim 1, wherein said lower end comprises a tapered ridge when closed.

4. A protector as defined in claim 1, wherein said closure comprises mating locking portions for closing said sidewalls together.

5. A protector as defined in claim 1, further comprising a break-resistant protective strip.

6. A protector as defined in claim 5, wherein said protective strip is retained within said space and is removable therefrom.

7. A protector as defined in claim 5, wherein said protective strip is molded in place within an upper region of said protector.

8. A fibre optic cable protector for subsurface burial, comprising two opposed elongate spaced apart sidewalls defining an interior space therebetween to receive at least one fibre optic cable, said sidewalls having upper and lower portions, said upper portions converging to form a closed tapered upper edge, said lower portions being openable to receive said one or more cables when in said open position, and a closure to selectively close said lower portions together to enclose said interior space for burial of said protector, the lower portions of said sidewalls converging when closed to facilitate penetration into a soft substrate.

9. A protector as defined in claim 8, wherein said sidewalls are semi-rigid to permit said sidewalls to flex together when closed.

10. A protector as defined in claim 9, wherein said closure includes mating locking portions for snap-locking said sidewalls together in said closed position.

11. A method of installing a protected fibre optic cable within a surface, comprising the steps of:

providing a trench within said surface;

providing a fibre optic cable protector comprising a pair of elongate opposed spaced-apart sidewalls defining an interior space therebetween, said sidewalls having upper and lower portions with said upper portions converging to form a generally tapered sealed upper edge of said protector, and a closure to selectively close said lower portion;

providing a length of one or more cables;

positioning said one or more cables within said protector while said protector is in an open position to receive said cable within said interior space;

closing said sidewalls together to fully enclose said cable within said interior space; and burying said protector with said one or more cables enclosed therein, within said trench.

12. A method as defined in claim 11, wherein said step of closing said protector comprises flexing said sidewalls together and snap-locking the lower portions of said sidewalls together with a mating closure.

* * * * *